No. 859,379.  
PATENTED JULY 9, 1907.

I. A. FLEMING.  
STUMP PULLER.  
APPLICATION FILED JAN. 15, 1907.

UNITED STATES PATENT OFFICE.

IRA A. FLEMING, OF UNION, WASHINGTON, ASSIGNOR TO AMELIA A. FLEMING, OF UNION, WASHINGTON.

STUMP-PULLER.

No. 859,379.

Specification of Letters Patent.

Patented July 9, 1907.

Application filed January 15, 1907. Serial No. 352,379.

*To all whom it may concern:*

Be it known that I, IRA A. FLEMING, a citizen of the United States, residing at Union city, in the county of Mason and State of Washington, have invented certain new and useful Improvements in Stump-Pullers, of which the following is a specification.

As is well known, great force is required for removing stumps of trees when clearing land. This invention provides a mechanism whereby a comparatively small force is augmented, or increased to such an extent as to insure the removal of the most obstinate obstruction such as a stump or boulder.

Figure 1:
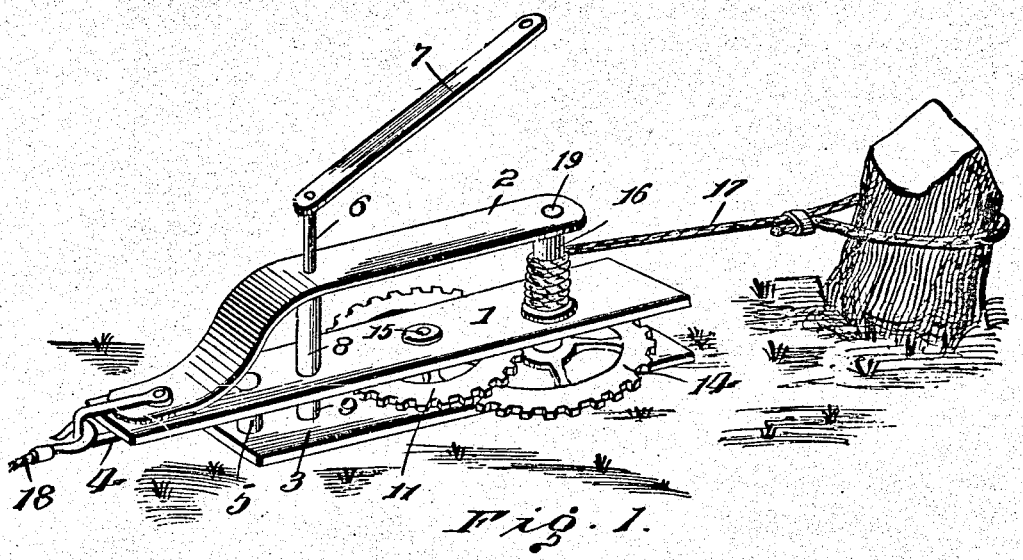
Figure 2:
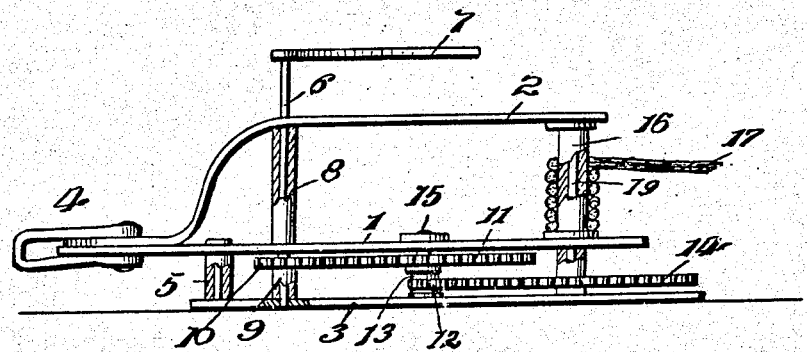

The invention relates to a train of gearing whereby effective leverage is manifolded, and a novel frame-work for the elements, whereby the strain is uniformly distributed, thereby preventing concentration of the stress at any one point which would tend to result disastrously and shorten the period of usefulness of the appliance.
For a full description of the invention and the merits thereof and also to acquire a knowledge of the details of construction of the means for effecting the result, reference is to be had to the following description and accompanying drawings.
While the invention may be adapted to different forms and conditions by changes in the structure and minor details without departing from the spirit or essential features thereof, still the preferred embodiment is shown in the accompanying drawings, in which:

Figure 1 is a perspective view of a stump puller embodying the invention. Fig. 2 is a side view thereof.

Corresponding and like parts are referred to in the following description and indicated in both views of the drawings by the same reference characters.

The frame-work of the device comprises a central member 1 which may be a plate, or bar, an upper member 2 and a lower member 3. The three bars 1, 2 and 3 have an approximate parallel arrangement, an end portion of the upper member being downwardly deflected and secured to an end portion of the central member 1, and a clevis 4 being fitted to said members at their meeting ends. The lower member 3 is secured at one end to the central member a short distance from the clevis 4 by means of a post 5 or analogous device. The power shaft 6 is mounted in each of the three members, 1, 2 and 3 and is provided at its upper end with a sweep 7 to which a team is hitched. Space sleeves 8 and 9 are mounted upon the power shaft and interposed between the central member 1 and the upper and lower members 2 and 3 respectively. The lower space sleeve 9 is fast to the power shaft so as to rotate therewith and is provided with a pinion 10 which meshes with the teeth of a gear wheel 11 loose upon a shaft 15 connecting the members 1 and 3. The gear wheel 11 has a pinion 12 connected therewith by sleeve 13, the pinion 12 being in mesh with gear wheel 14 loose on shaft 19 connecting the three members 1, 2 and 3 of the frame-work. A spool or drum 16, formed with, or connected to, the gear wheel 14 so as to rotate therewith, is arranged between the members 1 and 2 and is adapted to have the operating cable 17 wind thereon.

It is to be understood that the mechanism is to be of substantial structure and when arranged for use, an anchoring cable 18 is attached to the clevis 4 and is secured to one or more stems, or may be fast in any way to fix the position of the device while the same is in operation for removing the stump, or like obstruction, to be displaced. After the device has been firmly and securely anchored and the operating cable 17 has been hitched to the stump to be extracted, power is applied to the sweep 7 and is transmitted from the shaft 6 to the spool, or drum, 16 through the intervention of the intermediate gearing herein referred to.

It will be understood that the power applied to the sweep is augmented many times in its application to the spool, or drum 16; hence the great force exerted for winding the cable 17 upon said spool, or drum, is applied directly to the stump to be up-rooted and the displacement thereof is effected in a simple and convenient way as will be readily comprehended.

Having thus described the invention, what is claimed as new is:

1. A stump puller comprising a frame-work embodying upper, lower and a central member, a power shaft mounted in the three members, a shaft connecting the three members at some distance from said power shaft, a spool, or drum, mounted upon said shaft and arranged between the upper and central members of the frame-work, a gear wheel rotatable with said spool and located between the central and lower frame members, an intermediate gearing between the power shaft and said gear wheel for transmitting motion to the latter, said gearing being arranged between the central and lower members of the frame-work.

2. A stump puller comprising a frame-work embodying a central and upper and lower members, the upper member having an end portion deflected toward and secured to the central member, a power shaft mounted in the three members of the frame-work, spacing sleeves upon the power shaft and arranged between the several members of the frame-work, the lower spacing sleeve being fast to the power shaft and provided with a pinion, a shaft connecting the frame members at a point remote from the power shaft, a spool, or drum, mounted on said shaft and having a gear wheel and gearing intermediate of the pinion of the power shaft and the gear wheel of said spool for transmitting power from said shaft to the spool and augmenting said power, said gearing being arranged between the central and lower members of the frame-work.

In testimony whereof I affix my signature in presence of two witnesses.

IRA A. FLEMING. [L. S.]

Witnesses:
CHARLES GEHT
HEBERT BACKER.